(12) United States Patent
Olson et al.

(10) Patent No.: US 6,519,138 B1
(45) Date of Patent: Feb. 11, 2003

(54) MODULAR LOGIC BOARD CHASSIS FOR A DESKTOP COMPUTER

(75) Inventors: Robert Norman Olson, Mountain View, CA (US); David V. Hoenig, Los Gatos, CA (US); Christopher J. Novak, San Jose, CA (US); Glen T. Walters, Moorpark, CA (US)

(73) Assignee: Apple Computer, Inc., Cupertino, CA (US)

( * ) Notice: Subject to any disclaimer, the term of this patent is extended or adjusted under 35 U.S.C. 154(b) by 59 days.

(21) Appl. No.: 09/610,121

(22) Filed: Jun. 30, 2000

Related U.S. Application Data

(63) Continuation of application No. 09/187,499, filed on Nov. 5, 1998, now abandoned.

(51) Int. Cl.[7] .............................. G06F 1/16; H05K 5/00
(52) U.S. Cl. ...................... 361/683; 361/682; 361/686
(58) Field of Search ................................ 361/680, 681, 361/683, 682, 686, 727

(56) References Cited

U.S. PATENT DOCUMENTS

| | | | | |
|---|---|---|---|---|
| 4,734,874 A | * | 3/1988 | Hwang et al. .............. | 364/708 |
| 5,247,428 A | * | 9/1993 | Yu .............................. | 361/680 |
| 5,257,163 A | * | 10/1993 | Buist et al. .................. | 361/729 |
| 5,294,994 A | * | 3/1994 | Robinson et al. ........... | 348/825 |
| 5,815,369 A | * | 9/1998 | Quesada ..................... | 361/686 |
| 5,822,181 A | * | 10/1998 | Jung ........................... | 361/683 |
| 5,973,916 A | * | 10/1999 | Han ............................ | 361/682 |
| 6,335,861 B1 | * | 1/2002 | Ramsey, III et al. ....... | 361/686 |

* cited by examiner

*Primary Examiner*—Lynn D. Feild
(74) *Attorney, Agent, or Firm*—Henneman & Saunders; Larry E. Henneman, Jr.

(57) ABSTRACT

A computer (10) having a monitor housing (12) within which is affixed a logic module (24) having thereon a processor (36), a memory module (38), a fixed disk drive (40) and an external connector panel (46) all generally housed within a sheet metal housing (42) having therein a plurality of perforations (44) for allowing air from a fan assembly (30) to pass therethrough. A power supply (28) and monitor screen (14) are provided in the monitor housing (12) such that when the logic module (24) is mounted and electrically connected within the monitor housing (12) a generally complete computer (10) unit is provided. An auxiliary drive (16) is optionally provided and affixed to the logic module (24) such that the auxiliary drive (16) is externally accessible when the logic module (24) is affixed within the monitor housing (12).

51 Claims, 3 Drawing Sheets

MODULAR LOGIC BOARD CHASSIS FOR A DESKTOP COMPUTER

RELATED APPLICATIONS

This application is a continuation of U.S. patent application Ser. No. 9/187,499, filed Nov. 5, 1998, now abandoned having at least on inventor in common herewith, and being under obligation of assignment to a common assignee. The parent application is incorporated herein by reference in its entirety. This application is further related to a co-pending U.S. patent application Ser. No. 09/187,500, filed Nov. 5, 1998, entitled FLOATING MOUNT AND METHOD FOR MOUNTING A DEVICE TO A CHASSIS THEREBY, by David V. Hoenig, Chris J. Novak, Robert N. Olson, and Glen T. Walters, which is incorporated by reference herein in its entirety.

TECHNICAL FIELD

The present invention relates to the field of desktop computers and more specifically to a chassis for a desktop computer wherein a logic board chassis is removably affixed within a computer monitor unit. The predominant current usage of the present inventive modular logic board chassis is in desktop computers for home and office use, wherein it is desirable to have a tidy and compact package while retaining serviceability and other desirable aspects of appearance and functionality.

BACKGROUND ART

Small computer systems generally have at least the following three features; a computer processor unit, a monitor, and a keyboard. Other features, such as a mouse, a removable disk drive, and the like, may optionally be provided. Of the first three listed features, it is known in the art to combine two, or even all three, of these in a single housing, although the computer processor unit, monitor and keyboard are also frequently provided each in its own separate housing. An advantage of separate segregated components is that each such component is readily accessible for adding to or removing subcomponents therefrom. Moreover, if one of such segregated components fails, it can more easily be serviced and, if necessary, replaced. Indeed, a segregated component can easily be temporarily replaced while a failed component is serviced. In short, separate components provide a greater degree of flexibility.

On the other hand, more integrated units provide several distinct advantages. First, such units can be made more attractive to better fit aesthetically into a home or office environment, and such systems also generally take up less overall space. Moreover, the number of external connections and cables are minimized. External cables are generally unsightly and provide an additional source off failure in that the cables and connectors readily come loose and/or are damaged as components are moved around. Also, for many users, the very fact that there is no need to figure out where external cables are to be connected is, in and of itself, a primary advantage.

It would be useful to find a way to maximize the advantages both of segregated and integrated type computer systems. However, to the inventors' knowledge, no method or apparatus for adequately accomplishing this has existed in the prior art.

SUMMARY

Accordingly, it is an object of the present invention to provide an integrated computer wherein components thereof are easily removed and replaced.

It is still another object of the present invention to provide a computer device which is aesthetically pleasing.

It is yet another object of the present invention to provide a computer which requires a minimal number of external connections.

It is still another object of the present invention to provide a computer which can be easily upgraded by an end user.

It is yet another object of the present invention to provide a computer which is economical to produce and reliable in operation.

Various embodiments of the present invention achieve one or more of the above listed objects and/or provide one or more of the advantages listed herein. These objects and advantages of the invention should not, however, be construed as essential elements of the present invention. In fact, it should be understood that various embodiments might provide only a subset of the possible objects and/or advantages without departing from the spirit and scope of the invention.

Briefly, the preferred embodiment of the present invention is a computer housing generally resembling a monitor housing, having a monitor and power supply integral therein. A computer chassis sheet metal structure having active computer components Hathereon is removably affixed within said computer housing. Electrical connections are made within the chassis and, additionally, a user accessible panel of the chassis has connecting jacks such that external components may optionally be connected thereby. In the particular embodiment of the invention described herein, the chassis further has provision for affixing thereto an auxiliary mass storage device. According to the present inventive structure, electromechanical interference ("EMI") and thermal considerations are optimized to provide a maximum of cooling with a minimum of radiated and conducted emissions. The invention allows assembly of a computer by simply adding the chassis to a display enclosure, making the electrical connections, and attaching a plastic cover. It also allows easy removal of the chassis to enable service or upgrade to the unit, and allows the chassis to be separately tested before assembly into the computer.

It is an advantage of the present invention that high component density is achieved, thus allowing a relatively compact computer device.

It is another advantage of the present invention that chassis connectors are readily accessible, thus providing for the attachment of test equipment, or the like.

It is a further advantage of the present invention that major components of the computer can be readily temporarily and/or permanently replaced.

It is yet another advantage of the present invention that a computer can be made to be aesthetically pleasing while maintaining the accessibility of component devices therein These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible objects or advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed objects and/or advantages are not essential elements of the present invention, and should not be construed as limitations.

DETAILED DESCRIPTION

Figure 1:
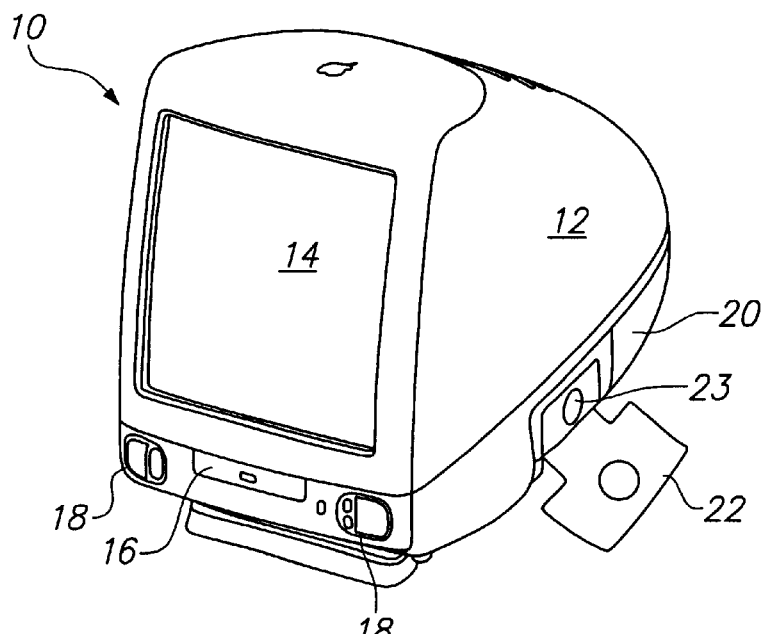
FIG. 1 is a perspective view of an example of a computer according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

Unless otherwise stated herein, component parts of the invention will be familiar to one skilled in the art, and may be purchased or readily manufactured accordingly. Also, unless otherwise stated herein, substitutions can be made for the components described, and each of the individual components, except as specifically claimed, is not an essential element of the invention.

An example of the inventive computer is depicted in a perspective view in FIG. 1, and is designated therein by the general reference character 10. This example of the computer has a monitor housing 12 with a monitor screen 14 mounted therein. In this embodiment, the inventive computer 10 is optionally equipped with features such as an auxiliary disk drive 16 which, in this embodiment is a digital versatile disk ("DVD"), speakers 18 and other such appurtenances not specifically recited herein. One skilled in the art will recognize that the computer 10 will have additional conventional features, such as a keyboard connector for connecting a keyboard (not shown) to the computer 10, a power connector for connecting electrical line power thereto, and the like, which will also not be specifically discussed herein.

A removable primary access panel 20 is shown in the view of FIG. 1 removably affixed to the monitor housing 12. A hinged connector access panel 22 is provided for covering a user access aperture 23 which is provided for accessing therethrough connectors which will be discussed in more detail hereinafter.

Figure 2:
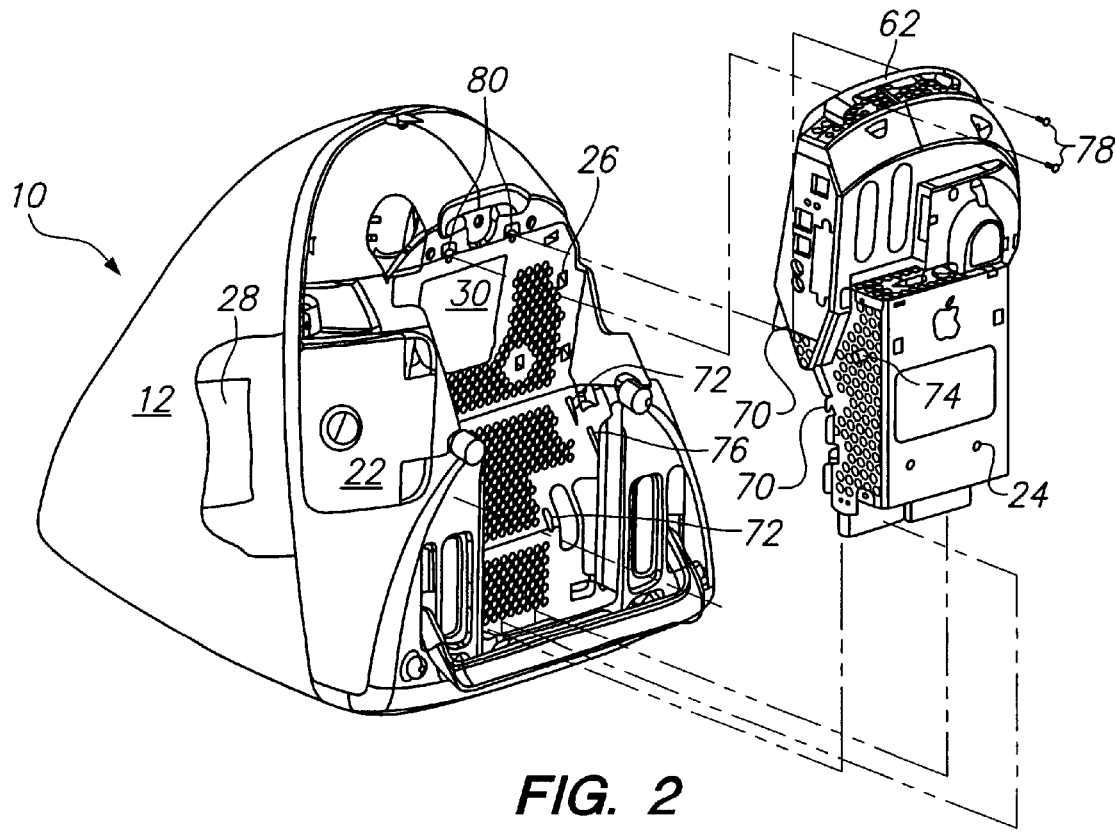
FIG. 2 is an exploded perspective view of the computer of FIG. 1.

FIG. 2 is an exploded perspective view of the computer 10 of FIG. 1, showing the computer 10 rotated such that the monitor screen 14 (not visible in the view of FIG. 2) is facing downward. Furthermore, in the view of FIG. 2, the access panel 20 is removed and is not shown in this view.

A logic module 24 is shown removed from a computer interior chassis 26. The computer interior chassis 26 is an interior structure within the monitor housing 12 to which components within the monitor housing 12 are attached. In this present embodiment of the computer 10 a power supply 28 provides required power to the monitor screen 14 and associated video electronics (not shown), as well as to devices mounted on the logic module 24 to be discussed hereinafter and other devices within the computer 10. A fan assembly 30 draws air through the logic module 24 and the computer interior chassis 26 to cool the interior of the monitor housing 12 and devices therein.

Figure 3:
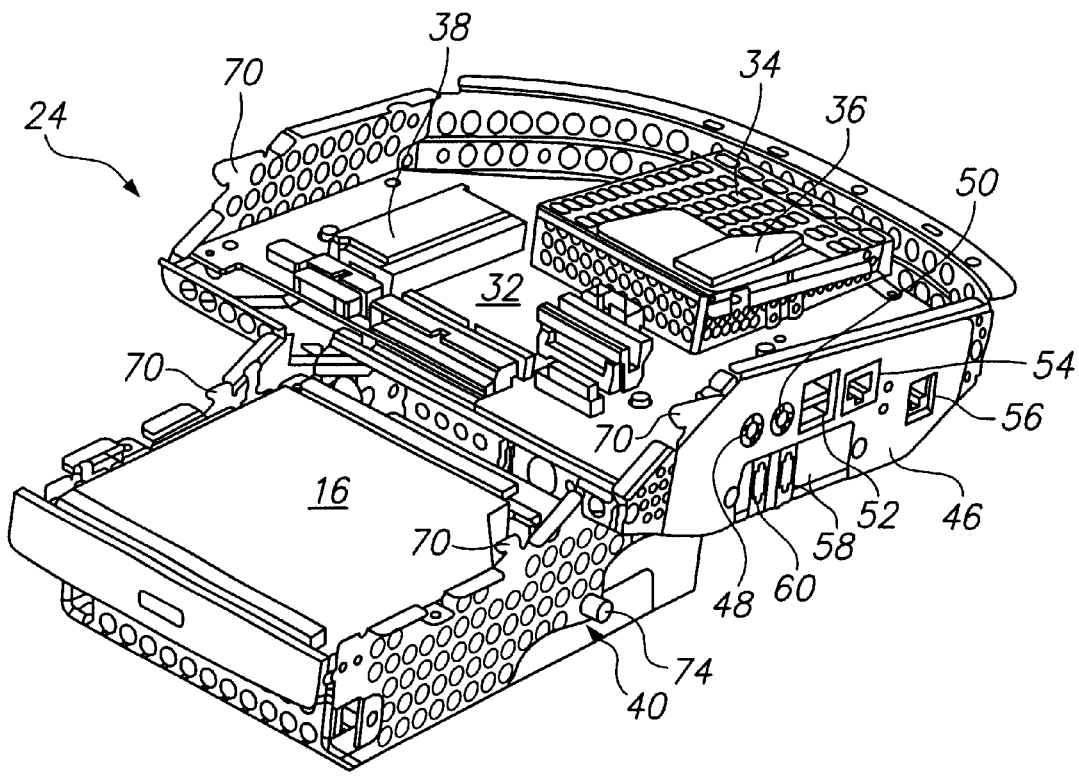
FIG. 3 is a partially cut away perspective view of the logic module of FIG. 2.

FIG. 3 is a partially cut away perspective view of the logic module 24, showing a main logic printed circuit board ("PCB") assembly 32, and a processor PCB enclosure 34 which is houses a processor 36. A memory module 38 is the RAM of the computer 10, and a fixed disk drive 40 (hard drive) can be seen in the view of FIG. 3 within the logic module 24. Also, in the view of FIG. 3 can be seen the auxiliary drive 16 which, as previously discussed herein, is provided in this example of the computer 10. Not specifically discussed herein are auxiliary components of the main logic PCB assembly 32 which, along with those specifically mentioned, combine such that the logic module 24 is generally functionally equivalent to conventional prior art computers such as might have been configured as a stand alone unit in the prior art, with the significant exception that the present inventive configuration and application provide the advantages recited herein. It will be noted that the components of the main logic PCB assembly 32, including the processor 36, the memory module 38, the fixed disk drive 40, the auxiliary drive 16, and others not specifically discussed, will be electrically connected via circuitry on the main logic PCB assembly 32, as well as by wires and subassembly circuit boards not specifically discussed herein. Such electrical connections, while perhaps in some cases themselves unique, do not specifically form a part of this present inventive subject matter, and will not be specifically detailed herein.

It can be seen in the views of FIG. 2 and FIG. 3 that the logic module 24 of this presently described example has a sheet metal housing 42 generally within which are housed the components of the logic module 24 as discussed previously herein. The sheet metal housing 42 has a plurality of perforations 44 therein such that air can pass therethrough for cooling. An external connector panel 46 is positioned such that, in the assembled computer 10 (FIG. 1) access thereto can be had through the hinged connector access panel 22 (FIG. 1). The external connector panel 46 has a plurality of external connectors 47 including, in this example of the invention, an audio in jack 48, an audio out jack 50, a universal serial bus ("USB") jack 52, an Ethernet jack 54, and a modem jack 56. Also, in the presently described embodiment of the computer 10, is an expansion card slot 58 for optionally mounting thereinto one or more expansion card(s) 60 (two are shown in this example), such as may be developed in the future.

Figure 4:
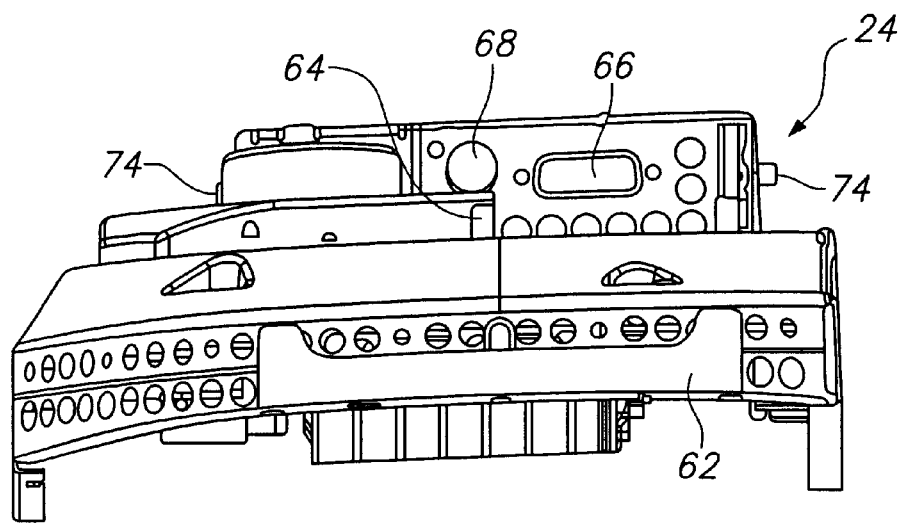
FIG. 4 is an elevational end view of the logic module of FIG. 3.

FIG. 4 is an end view of the logic module 24 showing a handle 62 (also visible in the view of FIG. 2). A plurality of internal connectors 63 including, in this embodiment of the invention, a power connector 64, a video connector 66 and an infrared data association ("IrDA") connector 68 are provided for making internal electrical connections between the logic module 24 and components within the monitor housing 12. (It should be noted that connecting cables which might be used to connect between the logic module 24 and components within the monitor housing 12 are omitted from the view of FIG. 2.) One skilled in the art will recognize that any of many different methods or apparatus could be used, alone or in combination, to make necessary electrical connections between the logic module 24 and components within the monitor housing 12. These include, but are not limited to, electrical connectors which will align and inherently electrically connect when the logic module 24 is positioned and affixed within the monitor housing 12.

While a great variety of attachment devices and/or methods might be employed alone, or in combination, to affix the removable logic module 24 within the monitor housing 12, in this presently described embodiment, a plurality (four, in this example) of hook tabs 70 (two of which are visible in the view of FIG. 2, and all four of which are visible in the view of FIG. 3) are provided on the logic module 24 for insertion into a like plurality of tab slots 72 (FIG. 2) of the interior chassis 26. To further assist in positioning of the logic module 24 within the monitor housing 12 are two alignment pins 74 (one on each side of the sheet metal housing 42, only one of which is visible in the view of FIG. 2 and the view of FIG. 3., and both of which are visible in the view of FIG. 4). The alignment pins 74 are intended to fit into a like plurality of alignment pin slots 76 (one of which is visible in the view of FIG. 2). With the logic module 24 positioned such that the hook tabs 70 are fitted into the tab slots 72 and the alignment pins 74 are fitted into the alignment pin slots 76, the logic module 24 is secured to the interior chassis 26 by screwing two attachment screws 78 into two receiving screw holes 80 in the interior chassis 26, as shown in the view of FIG. 2. Whereupon, electrical connections are made between the power supply 28 and the power connector 64 of the logic module 24, and between the remaining connectors 64 and 68 of the logic module and appropriate components within the monitor housing 12, as previously discussed herein.

Figure 5:
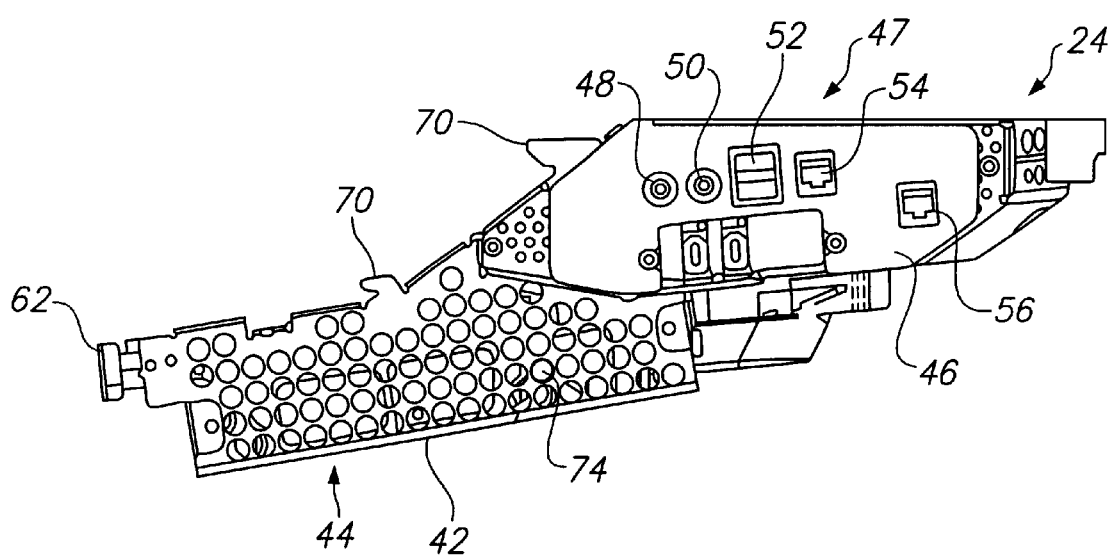
FIG. 5 is a side elevational view of the logic module of FIGS. 3 and 4.

FIG. 5 is a side elevational view of the logic module 24 showing in better detail the external connectors 47 of the external connector panel 46 which, in the assembled computer 10, are accessible through the connector access aperture 23. Also visible in the view of FIG. 5 are one of the alignment pins 74 and two of the hook tabs 70 of the sheet metal housing 42.

According to the present invention, with the logic module 24 affixed within and electrically connected to the monitor housing 12, a generally complete computer 10 is presented, ready to be connected to a keyboard, mouse, external electrical power, and whatever other connections might optionally be desired. The computer 10 is generally more compact and aesthetically pleasing that many prior art component type computer devices, while retaining the easy serviceability and other advantages of such devices. Further, the unique structure of the computer 10 is less likely to suffer failure due to connector malfunction than is a separate component system, even though the advantages of a separate component system are also achieved.

Various modifications may be made to the invention without altering its value or scope. For example, the specific shape, methods or means for attachment, and configuration of the embodiment described herein are all features of the embodiment and are specifically not limitations of the invention. Moreover, it is envisioned by the inventors that many combinations of components, including those discussed herein and others, could be optionally included with or omitted from the invention.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

We claim:

1. A computer, comprising:
    a monitor unit having a display screen and a monitor housing, said monitor housing including a front, a first side, a second side, and a bottom, said bottom defining a module receiving recess; and
    a computer module removably affixed to said monitor unit at least partially within said recess and at least partially enclosed within said monitor housing; and
    an electrical connector for selectively electrically connecting said computer module to said monitor unit.

2. A computer according to claim 1, further including:
    a printed circuit board affixed to said computer module; and
    a processor and associated random access memory affixed to said printed circuit board.

3. A computer according to claim 1, wherein said computer module has an attachment portion for attaching said computer module to said monitor unit.

4. A computer according to claim 3 wherein, said attachment portion includes a hook projection for engaging a tab slot of said monitor unit.

5. A computer according to claim 3, wherein said attachment portion includes an alignment pin projection.

6. A computer according to claim 5, wherein said alignment pin projection is adapted to fit within an alignment aperture of said housing.

7. A computer according to claim 1, further including a fixed disk drive affixed to said computer module.

8. A computer according to claim 1, wherein enclosed within a processor chassis affixed to the printed circuit board.

9. A computer according to claim 1, wherein
    said computer module includes an external connector panel; and
    said monitor housing further defines an access aperture through at least one of said first side and said second side for providing access to said external connector panel when said computer module is fixed to said monitor unit.

10. A computer according to claim 9, wherein:
    said external connector panel includes an audio jack.

11. A computer according to claim 9, wherein:
    said external connector panel includes an expansion card slot.

12. A computer according to claim 9, wherein:
    said external connector panel includes an Ethernet connector.

13. A computer according to claim 9, wherein:
    said external connector panel includes a modem jack.

14. A computer according to claim 9, further comprising a cover adapted to engage said access aperture.

15. A computer according to claim 1, further including an internal electrical connector within said housing adapted to electrically connect said computer module to said monitor unit.

16. A computer according to claim 15, wherein:
    said monitor unit includes a power supply; and
    said internal electrical connector is a power connector for coupling said computer module to said power supply.

17. A computer according to claim 15, wherein said internal electrical connector is an IrDA connector.

18. A computer according to claim 15, wherein said internal electrical connector is a video connector.

19. A computer according to claim 1, further comprising:
a removable media disk drive device fixed to said computer module; and wherein
said monitor housing further defines an aperture through a front of said monitor housing for accessing said removable media disk drive device.

20. A computer according to claim 1, wherein:
said recess is bounded by a wall separating the interior of said monitor housing from the exterior of said monitor housing; and
said computer module is removably affixed to the monitor unit on the exterior side of said wall.

21. A computer according to claim 20, wherein:
said wall further defines a plurality of apertures; and
said computer further includes a far disposed to move air through said apertures.

22. A computer according to claim 1, wherein:
said computer module includes an external connector;
said monitor housing defines an access aperture; and
when said monitor housing is fully assembled and said computer module is affixed to said fully assembled monitor housing, said external connector is accessible through said access aperture.

23. A computer according to claim 1, further comprising a support base mounted to said computer module, whereby said computer module and said monitor unit are supported by said support base.

24. A computer according to claim 1, further comprising a support base mounted to said computer module, whereby said computer logic module and said monitor unit are supported by said support base.

25. A computer, comprising:
a monitor unit having a monitor chassis for supporting a display, and a monitor housing for at least partially enclosing said monitor chassis and said display, said monitor housing defining an opening exposing a portion of said monitor chassis; and
a computer logic module removably affixed to said chassis of said monitor unit through said opening; and wherein
said monitor housing at least partially encloses said logic module chassis.

26. A computer according to claim 25, further including an electrical connector fixed to said chassis for selectively electrically connecting said computer logic module to said monitor unit.

27. A computer according to claim 25, wherein said monitor unit includes a cathode ray tube.

28. A computer according to claim 25, wherein said computer logic module includes a central processing unit and an associated random access memory.

29. A computer according to claim 25, wherein said computer logic module further includes a mass storage device.

30. A computer according to claim 29, wherein said mass storage device is a fixed disk drive.

31. A computer according to claim 29, wherein:
said mass storage device is a removable media disk drive device; and
said monitor housing further includes a front, a first side, and a second side, at least one of which defines an aperture for accessing said removable media disk drive device.

32. A computer according to claim 29, wherein said mass storage device is removably affixed to said computer logic module.

33. A computer according to claim 25, wherein:
said monitor unit includes a power supply; and
said computer logic module includes a power connector for connecting to said power supply.

34. A computer according to claim 25, wherein:
said computer logic module includes an electrical connector fixed thereon;
said monitor housing further includes a front, a first side, and a second side, at least one of which defines an access aperture for providing access to said electrical connector.

35. A computer according to claim 34, wherein the electrical connector is a telephone line modem connector.

36. A computer according to claim 34, wherein the electrical connector is a network connector.

37. A computer according to claim 34, wherein the electrical connector is an audio connector.

38. A computer according to claim 34, further including a connector access panel for selectively covering the access aperture.

39. A computer according to claim 25, further including a universal serial bus jack affixed to said computer logic module and accessible while said computer logic module is affixed at least partially within said monitor housing.

40. A computer according to claim 25, wherein:
said computer logic module includes a module chassis; and
said computer logic module is removably affixed to said monitor unit by said module chassis engaging said monitor chassis.

41. A computer according to claim 40, wherein:
one of said monitor chassis and said module chassis include a plurality of slots; and
the other of said monitor chassis and said module chassis include a plurality of hook projections for engaging said plurality of slots.

42. A computer according to claim 41, wherein:
said hook projections are disposed on said computer logic module; and
said slots are disposed in said monitor chassis.

43. A computer according to claim 25, further including:
a plurality of alignment projections on one of monitor housing and said computer logic module; and
a plurality of alignment slots within the other of said monitor housing and said computer logic module for accepting the alignment projections.

44. A computer according to claim 25, wherein:
said exposed portion of said monitor chassis includes a wall defining an interior and an exterior of said monitor unit; and
said computer logic module is removably affixed to the monitor unit on the exterior side of said wall.

45. A computer according to claim 44, wherein:
said wall further defines a plurality of apertures; and
said computer further includes a fan disposed to move air through said apertures.

46. A computer according to claim 25, wherein:
said computer logic module includes an external connector;
said monitor housing defines an access aperture; and
when said monitor housing is fully assembled and said computer logic module is affixed to said fully assembled monitor housing, said external connector is accessible through said access aperture.

47. A method for constructing a computer, comprising:

a) providing a logic unit having a printed circuit board affixed thereto, a processor device affixed to the printed circuit board, random access memory affixed to the circuit board, and a disk drive mounted to said logic unit;

b) providing a monitor unit including a monitor screen, a monitor housing and a power supply, said monitor housing including a bottom and a receiving portion formed in the bottom for receiving and at least partially enclosing said logic unit;

c) affixing said logic unit to said monitor unit through said receiving portion.

48. A method according to claim 47, wherein:

one of said logic unit and said monitor unit includes a plurality of alignment projections;

the other of said logic unit and said monitor unit includes a plurality of alignment apertures for receiving said plurality of alignment projections; and said step of affixing said logic unit to said monitor unit includes guiding said plurality of alignment projections into engagement with said plurality of apertures.

49. A method according to claim 47, wherein:

said monitor unit has an access aperture spaced apart from said receiving portion formed therein;

said logic unit includes an electrical connector; and said logic unit is affixed to said monitor unit such that said electrical connector is accessible through the access aperture.

50. A method according to claim 47, wherein:

said computer logic module includes an electrical connector; and said step of affixing said logic unit to said monitor unit further includes aligning said electrical connector with an access aperture formed in a portion of said monitor housing previously fixed to said monitor unit.

51. A method according to claim 47, further comprising attaching a support base to said computer module.

* * * * *

UNITED STATES PATENT AND TRADEMARK OFFICE
CERTIFICATE OF CORRECTION

PATENT NO.    : 6,519,138 B1
DATED         : February 11, 2003
INVENTOR(S)   : Olson et al.

It is certified that error appears in the above-identified patent and that said Letters Patent is hereby corrected as shown below:

Column 6,
Line 34, insert -- said processor is at least partially -- between "wherein" and "enclosed".

Column 7,
Line 17, delete "far" and insert -- fan --.

Signed and Sealed this

Seventeenth Day of June, 2003

JAMES E. ROGAN
*Director of the United States Patent and Trademark Office*